United States Patent [19]

Huang et al.

[11] Patent Number: 5,566,273
[45] Date of Patent: Oct. 15, 1996

[54] SUPERVISED TRAINING OF A NEURAL NETWORK

[75] Inventors: Hsin-Hao Huang, Kaohsiung, Taiwan; Shui-Shun Lin, Tallahassee, Fla.; Gerald M. Knapp, Baton Rouge, La.; Hsu-Pin Wang, Tallahassee, Fla.

[73] Assignee: Caterpillar Inc., Peoria, Ill.

[21] Appl. No.: 176,458

[22] Filed: Dec. 30, 1993

[51] Int. Cl.$^6$ .............................. G06K 9/62; G06K 9/00
[52] U.S. Cl. .................. 395/23; 395/22; 395/24; 395/27
[58] Field of Search .................. 395/22, 23, 24, 395/27

[56] References Cited

U.S. PATENT DOCUMENTS

| | | | |
|---|---|---|---|
| 4,803,736 | 2/1989 | Grossberg et al. | 395/25 |
| 4,914,708 | 4/1990 | Carpenter et al. | 395/24 |
| 5,040,214 | 8/1991 | Grossberg et al. | 395/22 |
| 5,058,180 | 10/1991 | Khan | 395/22 |
| 5,133,021 | 7/1992 | Carpenter et al. | 395/24 |
| 5,142,590 | 8/1992 | Carpenter et al. | 382/14 |
| 5,157,738 | 10/1992 | Carpenter et al. | 395/23 |
| 5,214,715 | 5/1993 | Carpenter et al. | 395/24 |
| 5,311,601 | 5/1994 | Carpenter et al. | 395/24 |

FOREIGN PATENT DOCUMENTS

| | | |
|---|---|---|
| 0244483B1 | 7/1992 | European Pat. Off. . |
| WO9213306 | 8/1992 | WIPO . |

OTHER PUBLICATIONS

Carpenter et al., "Art 2: Self-Organization of Stable Category Recognition Codes for Analog Input Patterns," *Applied Optics*, vol. 26, No. 23, pp. 4919–4930, Dec. 1, 1987.

Carpenter et al., "ARTMAP: Supervised Real–Time Learning and Classification of Nonstationary Data by a Self–Organizing Neural Network," *Neural Networks*, vol. 4, pp. 565–588, 1991.

Huang et al., "Machine Fault Classification Using an ART 2 Neural Network," Nov. 1991, Accepted for International Journal of Advance Manufacturing Technology, May 1992.

Huang et al., "Artmap Neural Networks for Closed–loop Welding Process Control," to appear in *Artificial Intelligence in Optimal Design and Manufacturing*, edited by Z. Dong, 1994.

Spoerre, Julie K., "Machine Performance Monitoring and Fault Classification Using an Exponentially Weighted Moving Average Scheme," Thesis, May 1993.

Huang et al, "Tandem Artmap Neural Networks for Feedback Process Control: A Welding Example", production Engineering Division–vol. 57, Neural Network in Manufacturing and Robotics American Society of Mechanical Engineers, Nov. 8–13, 1992.

"ARTMAP: Supervised Real–Time Learning and Classification of Nonstationary Data by a Self-Organizing Neural Network", Carpenter et al, IEEE Conf. on Neural Networks for Ocean Engineering, 15–17, Aug. 1991.

"ARTMAP: A Self-Organizing Neural Network Architecture for Fast Supervised Learning and Pattern Recognition", Carpenter et al, IJCNN, 8–14 Jul., 1991.

*Primary Examiner*—George B. Davis
*Attorney, Agent, or Firm*—Sterne, Kessler, Goldstein & Fox

[57] ABSTRACT

The present invention provides a system and method for supervised training of a neural network. A neural network architecture and training method is disclosed that is a modification of an ARTMAP architecture. The modified ARTMAP network is an efficient and robust paradigm which has the unique property of incremental supervised learning. Furthermore, the modified ARTMAP network has the capability of removing undesired knowledge that has previously been learned by the network.

14 Claims, 9 Drawing Sheets

```
3 5 5 0.900000 3 2
CAT1
CAT2
CAT3
4.999996  4.999996  0.000000  0.000000  0.000000  0.000000  1.154701  0.000000  1.154701  0.000000
0.000000  0.000000  4.999996  4.999996  0.000000  0.000000  1.154701  0.000000  1.154701  0.000000
0.000000  0.000000  0.000000  0.000000  4.999996  4.999996  1.154701  0.000000  1.154701  0.000000
0.000000  0.000000  0.000000  0.000000  0.000000  0.000000
1.000000  1.000000  0.000000  0.000000  0.000000  0.000000
0.000000  0.000000  1.000000  1.000000  0.000000  0.000000
1.000000  1.000000  0.000000  0.000000  1.000000  1.000000
1.000000  1.000000  1.000000  1.000000  1.000000  1.000000
```

A. NETWORK FILE BEFORE UNLEARNING PATTERN A2

```
3 5 5 0.900000 2 1
CAT1
CAT3
4.999996  4.999996  0.000000  0.000000  0.000000  1.154701  0.000000  1.154701  0.000000
0.000000  0.000000  4.999996  4.999996  0.000000  1.154701  0.000000  1.154701  0.000000
0.000000  0.000000  0.000000  0.000000  4.999996  1.154701  0.000000  1.154701  0.000000
0.000000  0.000000  0.000000  0.000000  0.000000
1.000000  1.000000  0.000000  0.000000  0.000000
0.000000  0.000000  1.000000  1.000000  0.000000
1.000000  1.000000  0.000000  0.000000  1.000000
1.000000  1.000000  1.000000  1.000000  1.000000
```

B. NETWORK FILE AFTER UNLEARNING PATTERN A2

SUPERVISED TRAINING OF A NEURAL NETWORK

CROSS-REFERENCE TO CO-PENDING APPLICATIONS

The following applications are assigned to the assignee of the present application:

U.S. patent application entitled "Machine Fault Diagnostics System and Method," Attorney Docket No. 1246.0410000 and Ser. No. 08/176,482, naming as inventors Hsu-Pin Wang, Hsin-Hoa Huang, Gerald M. Knapp, Chang-Ching Lin, Shui-Shun Lin, and Julie M. Spoerre, filed concurrently herewith, the disclosure of which is hereby incorporated by reference in its entirety.

U.S. patent application entitled "Machine Performance Monitoring and Fault Classification Using an Exponential Weighted Moving Average Scheme," Attorney Docket No. 1246.0430000 and Ser. No. 08/176,458, naming as inventors Julie M. Spoerre, Chang-Ching Lin, and Hsu-Pin Wang, filed concurrently herewith, the disclosure of which is hereby incorporated by reference in its entirety.

BACKGROUND OF THE INVENTION

1. Field of the Invention

The present invention relates generally to the field of training a neural network and, more particularly, to a system and method that provides a supervised learning environment for a neural network.

2. Related Art

The artificial neural network is a simulation of the biological neural network of the human brain. The artificial neural network accepts several inputs, performs a series of operations on the inputs, and produces one or more outputs. It has been studied in the hope of achieving human-like performance in solving problems with complex, incomplete, or seemingly unrelated data which cannot be solved by conventional programming techniques. The power of artificial neural networks lies in their computational speed and ability to provide a high degree of robustness or fault-tolerance.

A typical artificial neural network consists of a number of connected neurons or processing nodes, and a learning algorithm. A neuron is, in turn, composed of three elements: weighted connections, an integration function, and an activation function. Through the weighted connections, the neuron receives inputs from those connected to it in a previous layer (of neurons), and transfers output to those connected to it in the next layer (of neurons). The integration function simply sums up the received inputs. The activation function, which usually is in the form of a non-linear sigmoid function, converts the integrated input into an output. Mathematically, an integration function is shown as follows:

$$I_{pj} = \sum_i O_{pi} W_{ji}$$

where $i_{pj}$ is the integrated input of neuron j corresponding to input pattern p, $O_{pi}$ is the output from neuron i, $W_{ji}$ is the connection weight between neurons i and j.

An activation function usually takes the following form:

$$O_{pj} = \frac{1}{1 + e^{(I_{pj} - \beta)}}$$

where $\beta$ is the bias of neuron j.

There are two primary connection types, inhibitory and excitatory. Inhibitory connections decrease the activation of processing elements to which they are connected, while excitatory connections increase the activation. Therefore, a portion of the connections to a particular neuron may have negative weights (inhibitory) and the remainder have positive weights (excitatory).

Because artificial neural networks are formed and operated in a parallel fashion, they have been found to be able to perform complex computations simultaneously and rapidly. In addition, because a network consists of a number of neurons (processing elements), when even a few neurons or their interconnections are damaged, the network can still maintain its regular performance (see generally, Hopfield, J. J., "Neural Networks and Physical Systems with Emergent Collective Computational Abilities," *Proceedings of the National Academy of Sciences,* Vol. 74, 1982, pp. 2554–2558;, Hopfield, J. J., "Neurons with Graded Response Have Collective Computational Properties Like Those of Two-State Neurons," *Proceedings of the National Academy of Sciences,* Vol. 81, 1984, pp. 3088–3092; and Lippmann, R. P., "An Introduction to Computing with Neural Nets," *IEEE ASSP Magazine,* April 1987, pp. 4–22).

The most important property of neural networks is their learning ability. A learning algorithm is used to train the network to learn a (sometimes arbitrary) mapping between the input space and the output space by adjusting the interconnection weights. Two types of learning algorithms are generally used in training the network: supervised learning and unsupervised learning. Supervised learning requires an external feedback of error signals after each mapping. Examples are back propagation (BP) (see Rumelhart and McClelland, *Parallel Distributed Processing,* Vol. 1, MIT Press, Cambridge, Mass., 1986); Cerebellar Model Arithmetic Computer (CMAC) (see Miller et al., "CMAC: An Associative Neural Network Alternative to Backpropagation," *Proceeding of the IEEE,* Vol. 78, No. 10, October 1990, pp. 1561–1567); and Brain-State-in-a-Box (BSB) (See Anderson, J. A., "Neural Models with Cognitive Implications," *Basic Processes in Reading Perception and Comprehension,* edited by D. LaBerge and S. J. Samuels, Erlbaum, N.J., 1977, pp. 27–90). Unsupervised learning does not require any external feedback during the training process. Examples are Adaptive Resonance Theory (ART) (see Carpenter, B. A. and Grossberg, S. "A Massively Parallel Architecture for a Self-Organizing Neural Pattern Recognition Machine," *Computer Vision,* Graphics, and Image Processing, Vol. 37, 1987, pp. 54–115 and Carpenter G. A. and Grossberg, S., "ART 2: Self Organization of Stable Category Recognition Codes for Analog Input Patterns," *Applied Optics,* Vol 26, No. 23, 1987, pp. 4919–1930) and the Hopfield network (see Hopfield, J. J., "Neural Networks and Physical Systems with Emergent Collective Computational Abilities," cited above).

The identification of a machine or component fault is actually a pattern recognition problem. In the past, a number of pattern recognition techniques, such as linear discriminant function and fuzzy sets, have been applied to solve this type of problem. Normally, these techniques classify machine or component condition into a two-state situation, i.e., normal or abnormal. Examples can be found in Li, P. G. and Wu, S. M., "Monitoring Drilling Wear States by a Fuzzy Pattern Recognition Technique," *Journal of Engineering for Industry*, Vol. 110, August 1988, pp. 297–300; and Emel E. and Kannatey-Asibu E., Jr., "Tool Failure Monitoring in Turning by Pattern Recognition Analysis of AE signals," *Journal of Engineering for Industry*, Vol. 110, May 1988, pp. 137–145. Today, artificial neural networks are the most popular approaches in solving pattern recognition problems.

There are a number of different types of neural networks suitable for pattern classification. Among them, multi-layer feedforward networks are the most popular paradigms because they can solve non-linear problems which are unable to be solved by a linear single layer network, known as perceptrons. The multi-layer feedforward network has one or more layers of processing elements between the input and output layer. These layers are called hidden layers.

One of the most powerful and popular multi-layer feedforward networks is trained with back propagation. Back propagation was proposed by Rumelhart and McClelland as an algorithm for finding the optimal assignment of weights of network connections. It employs an iterative gradient descent algorithm to minimize the error measure between the actual output of the network and the desired output.

Figure 1:
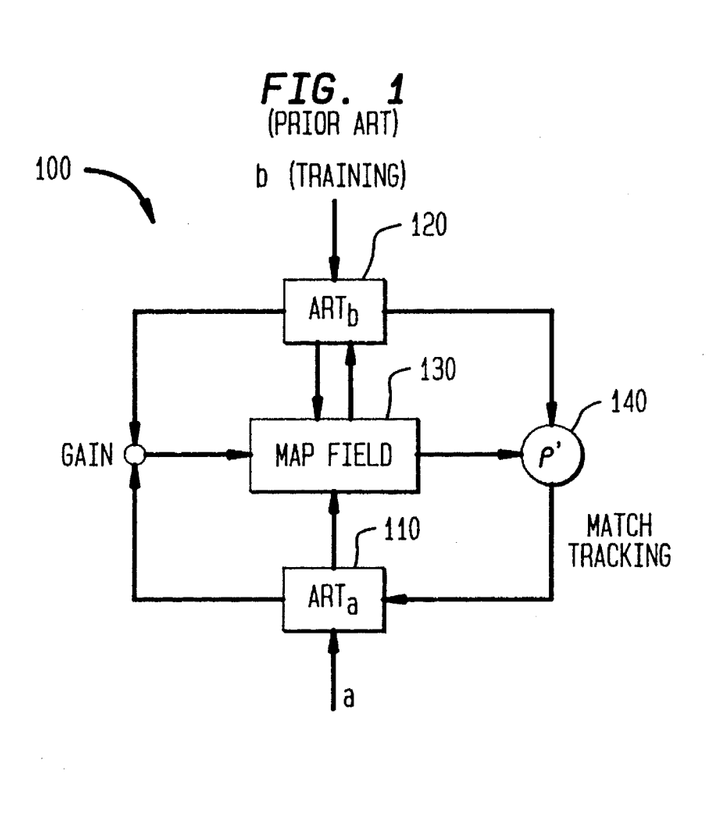
FIG. 1 illustrates a neural network architecture called Predictive Adaptive Resonance Theory (ART) or ARTMAP.

FIG. 1 shows a neural network architecture 100 called Predictive Adaptive Resonance Theory (ART) or ARTMAP. The ARTMAP architecture 100 autonomously learns to classify arbitrarily ordered vectors into recognition categories based on predictive success. See Carpenter, G. A., Grossberg, S., and Reynolds, J., "ARTMAP: Supervised Real-time Learning and Classification of Nonstationary Data by a Self-Organizing Neural Network," *Neural Networks*, Vol 4, 1991, pp. 569–588. This supervised learning system 100 is built from a pair of ART modules ($ART_a$ 110 and $ART_b$ 120) that are capable of self-organizing stable recognition categories in response to arbitrary sequences of input patterns.

Two classes of ART modules have been developed by Carpenter and Grossberg (Carpenter, B. A. and Grossberg, S. "A Massively Parallel Architecture for a Self-Organizing Neural Pattern Recognition Machine," and "ART 2: Self Organization of Stable Category Recognition Codes for Analog Input Patterns," both of which were cited above); ART 1 is capable of processing arbitrary sequences of binary input patterns, while ART 2 is capable of handling either binary or analog input patterns. These ART modules are linked by a Map Field 130 and an internal controller (not shown) that ensures autonomous system operation in real time. The Map Field 130 controls the learning of an associative map from $ART_a$ recognition categories to $ART_b$ recognition categories, as well as matching tracking of the $ART_a$ vigilance parameter 140 ($\rho'$). The vigilance parameter 140 determines the closeness between the ART. recognition category and the $ART_b$ recognition category.

The ARTMAP architecture 100, however, applies an unsupervised learning algorithm for training. Oftentimes, the pattern to be recognized is known beforehand and the unsupervised learning algorithm is a disadvantage. As such, what is desired is neural network architecture that provides the benefits of The ARTMAP architecture, but can be trained in a supervised manner.

SUMMARY OF THE INVENTION

The present invention provides a system and method for supervised training of a neural network. A neural network architecture and training method is disclosed that is a modification of an ARTMAP architecture. The modified ARTMAP network is an efficient and robust paradigm which has the unique property of incremental learning. Unlike other popular neural networks, such as back propagation, the modified ARTMAP network 200 does not have to be trained with all the patterns, old and new, every time a new pattern is discovered.

The modified ARTMAP network includes an ART module that accepts an input pattern. An ART 2 neural network is used as the underlying ART module. The ART module is connected to a map field that accepts as an input a target output pattern. The map field performs a mapping between a recognition category supplied by the ART module and the target output pattern. The map field also triggers a vigilance test that determines the closeness between the recognition category and the target output pattern. During the training of the modified ARTMAP network, both the input pattern and the desired output pattern are presented to the modified ARTMAP network. During the network testing phase, only the input pattern is provided.

Another unique feature of the modified ARTMAP network is an "unlearn" capability. In contrast to the network learning capability, the "unlearn" procedure removes "undesired" knowledge that has previously been learned by the network. This is very useful when a previously learned pattern is found to be a wrong pattern. Thus, the training does not have to be redone because of a single instance of wrong pattern.

BRIEF DESCRIPTION OF THE FIGURES

The above and further advantages of this invention may be better understood by referring to the following description taken in conjunction with the accompanying drawings, in which:

FIG. 10 shows the network file of a 3-5-5 network before and after unlearning a parameter that has previously been learned.

DETAILED DESCRIPTION OF THE PREFERRED EMBODIMENTS

A. Overview

Figure 2:
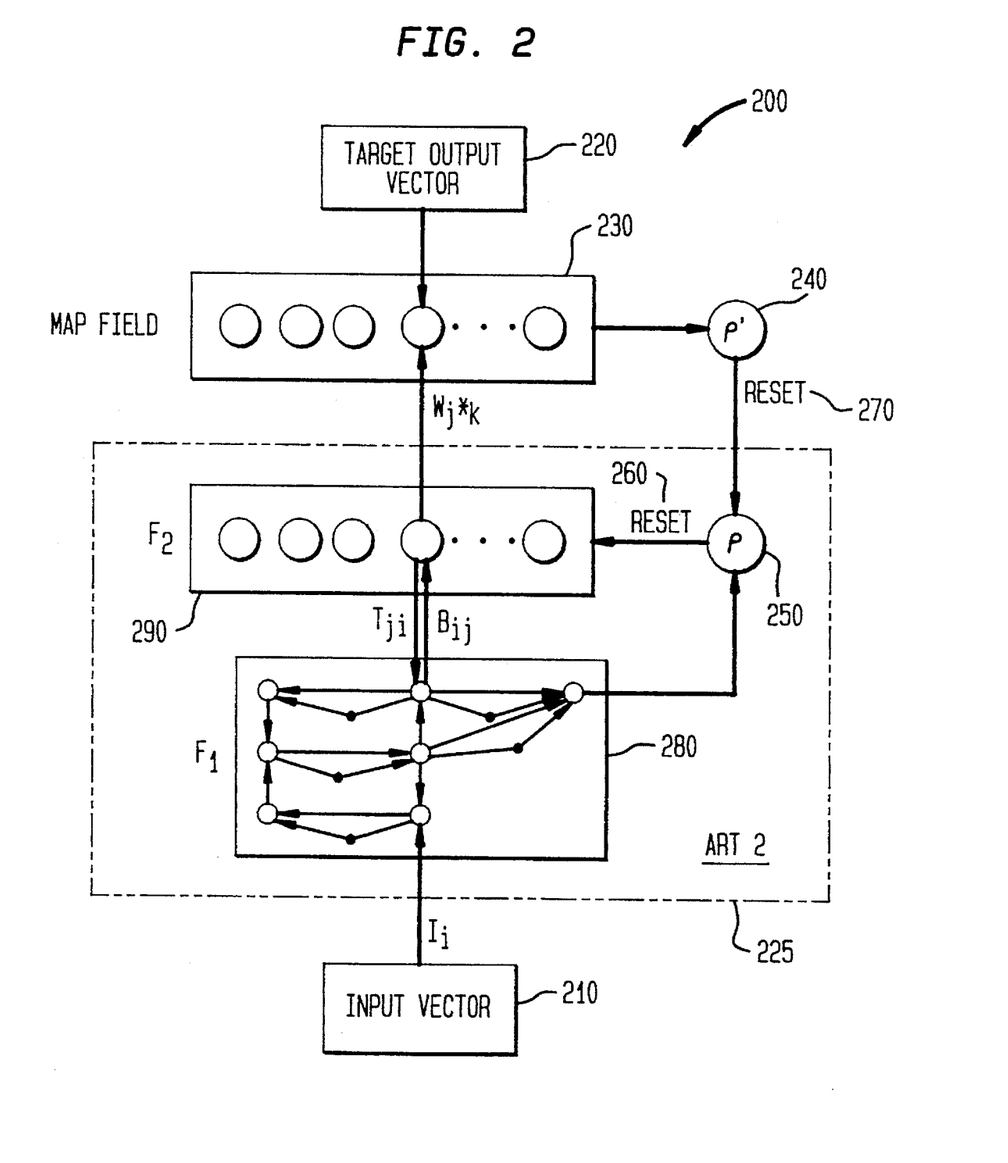
FIG. 2 illustrates a modified ARTMAP network adopted to perform supervised learning.

The present invention provides a system and method for supervised training of a neural network. A neural network architecture and training method is disclosed that is a modification of an ARTMAP architecture. FIG. 2 illustrates a modified ARTMAP network 200. The modified ARTMAP network 200 is an efficient and robust paradigm which has the unique property of incremental learning. Unlike other popular neural networks, such as back propagation, the modified ARTMAP network 200 does not have to be trained with all the patterns, old and new, every time a new pattern is discovered.

The modified ARTMAP network 200 includes an ART module 225 that accepts an input pattern 210 (also referred to as input vector 210). An ART 2 neural network is used as the underlying ART module 225. The ART module 225 is connected to a map field 230 that accepts as an input a target output pattern 220 (also referred to as a target output vector 220). The map field 230 performs a mapping between a recognition category supplied by the ART module 225 and the target output pattern 220. The map field 230 also triggers a vigilance test 240 that determines the closeness between the recognition category and the target output pattern 220.

During the training of the modified ARTMAP network 200, both an input pattern 210 and a desired output pattern 220 are presented to the network 200. In a preferred embodiment, an input pattern 210 consisted of two hundred (200) data points. The desired output pattern 220 is a binary vector, with each node of the vector corresponding to a particular machine condition. During the network testing phase, only the input pattern 210 is provided to the modified ARTMAP network 200.

Figure 3:
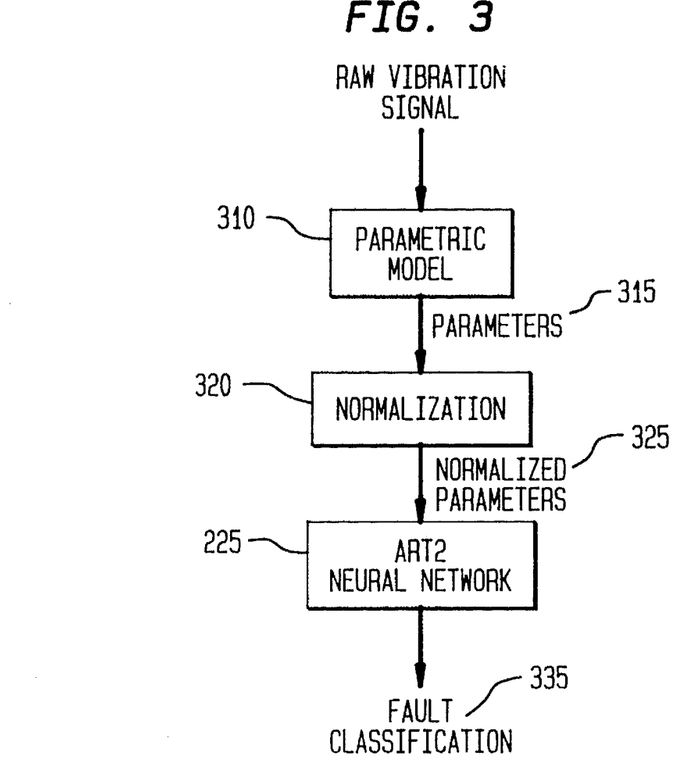
FIG. 3 shows a framework that illustrates the three phases of the present invention.

FIG. 3 shows the framework of the present invention. It comprises three modules: a parametric model 310, a normalization process 320, and an ART 2 neural network 225. In a preferred embodiment, an autoregressive (AR) parametric model is used in combination with the ART 2 neural network 225. However, an autoregressive moving average (ARMA) model can also be used. Both AR models and ARMA models are known in the art.

The parametric model 310 is used to fit (i.e., mathematically describe) a raw vibration signal collected from a physical machine or process under review. After fitting the parametric model 310 to the vibration signal, a set of parameters 315 can be obtained. At this point, however, the parameters 315 cannot be fed into the ART 2 network 225 without pre-processing because they contain meaningful negative values which the ART 2 network 225 is not able to recognize. Therefore, a normalization process 320 has to be applied in order to ensure that the ART 2 network 225 can perform correctly with proper inputs.

Figure 5:
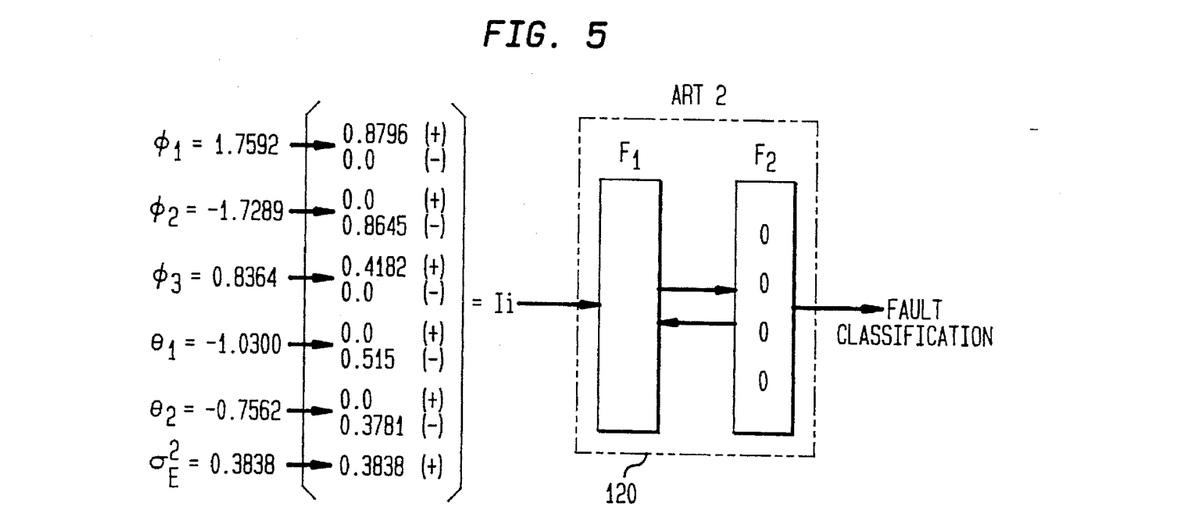
FIG. 5 shows an ART2 network with an example input vector.

The normalization process 320 requires two steps. First, each parameter 315 is divided into two parts: positive and negative. If a parameter 315 has a positive value, then the negative part will be assigned to zero, and vice versa. Secondly, scaling of the parameters 315 occurs by dividing each parameter 315 by the maximum parameter value. The residuals variance will only contain the positive part because its value is always positive. However, the variance needs to be divided by the maximum residuals variance. As such, an ARMA or AR model with n parameters will require 2n+1 input nodes in the ART 2 input layer. For example, an ART 2 network 225 for an ARMA (3, 2) model (n=5) will require 11 input nodes. The input vector to the ART 2 network 225 for the ARMA (3, 2) model with the following parameters and residual variance is shown in FIG. 5.

$\Phi_1 = 1.7592$ $\Phi_2 = 1.7289$ $\Phi_3 = 0.8364$ $\theta_1 = 1.0300$ $\theta_2 = -0.7562$ $\sigma_E = 0.3838$ Suppose the maximum parameter value for both the positive and negative part is equal to 2 and the maximum residuals variance is equal to 1. Take $\Phi_1$ for example, the negative part is set to 0 because its value is positive. The positive part is divided by the maximum parameter value, 2, and a value of 0.8796 is obtained. For the residual variance, the value remains the same because the maximum residual variance is 1.

During training of the network, the ART 2 network 225 is presented with an input pattern, i.e., the normalized parameters 325. As a result, the network self-organizes fault classifications until it runs out of input patterns. At last, the final top-down weights ($T_{ji}$) and bottom-up weights ($B_{ij}$) will be saved for later diagnostic use. During diagnosis of a fault, each input pattern is presented to the ART 2 network 225. Each node in the $F_2$ layer 290 represents a particular fault classification. The node in the $F_2$ layer 290 which passes the vigilance test 250 will be the output 335 of the ART 2 network 225.

As mentioned earlier, during the training of the modified ARTMAP network 200, both the input pattern 210 and the desired output pattern 220 have to be presented to the modified ARTMAP network 200. Each set of input patterns 210 and desired output patterns 220 is used to train the modified ARTMAP network 200 independently, which means that the modified ARTMAP network 200 can be trained incrementally. In a preferred embodiment, an input pattern 210 consisted of 200 data points of the vibration spectrum. The desired output pattern 220 is a binary vector, with each node of the vector corresponding to a particular machine condition.

B. Autoregressive (AR) Model

An autoregressive (AR) technique is a method of transferring signals from a time domain, the way they were captured through a set of sensors connected to a physical machine or process, to a frequency domain. Traditionally this is done with Fourier Transforms.

The benefit of using a parametric model for signal processing instead of Fourier Transforms is that it can dramatically reduce the amount of data and still preserve the important characteristics of the signal. As a result of data reduction, the diagnosis and training time of a neural network is greatly reduced. Since the training time increases about 10 times and the diagnosis time increases about 6 times when the number of input data increases from 200 to 2400, data reduction is critical, especially when multiple sensors are used in a real-time mode since the amount of data involved is increased. In a preferred embodiment, the present invention implements an AR model for on line signal processing. The mathematical form of an AR model is given in Equation 1.

$$X_t = \Phi_1 X_{t-1} + \Phi_2 X_{t-2} + \ldots + \Phi_p X_{t-p} + E_t \qquad (1)$$

where $X_t$=time series, $\Phi_i$=the AR parameters, p=the order of AR model, and $E_t$=residuals with NID (0, $\sigma_E^2$).

The order of the AR model is determined with an approach described in Lin, C.C., "Classification of Autoregressive Spectral Estimated Signal Patterns Using an Adaptive Resonance Theory (ART)," Master's Thesis, Department of Industrial Engineering, The University of Iowa, Iowa City, Iowa, 1992. It selects the order with the highest final prediction error (FPE) and Akaike information criterion (AIC) level. The equations of FPE and AIC are given by the following:

$$FPE(p) = \hat{o}_p^2 \left( \frac{N+(p+1)}{N-(p+1)} \right) \quad (2)$$

$$AIC(p) = N\ln(\hat{o}_p^2) + p\ln(N) \quad (3)$$

where N is the number of data samples, p is the AR order, and $\hat{o}^2_p$ is the estimated linear prediction error variance at order p. Once the AR order is determined, it is fixed and then the AR model can be fitted to the sensory data.

C. Modified ARTMAP Network

The modified ARTMAP neural network 200 is an extension of the ART (Adaptive Resonance Theory) network which autonomously learns to classify arbitrarily ordered vectors into recognition categories based on predictive success. As described above with reference to FIG. 1, the ARTMAP neural network 100 is an unsupervised learning system built from a pair of ART modules 110, 120 that each produce a recognition category, and a Map Field 130 which controls the mapping between the pair of recognition categories.

In a preferred embodiment, the ARTMAP neural network only uses one input pattern (i.e., AR parameters). As such, a modification to the ARTMAP network shown in FIG. 1 is made in order to perform supervised learning. FIG. 2 shows a modified ARTMAP network 200, in which the second ART module is replaced by a target output 220. The target output 220 is provided by a user. An ART 2 neural network architecture 225 is chosen as the underlying ART module to handle analog input patterns (e.g., AR parameters).

Specifically, the ART 2 neural network architecture is used in a preferred embodiment since vibration or sound signals are used as an input to the modified ARTMAP neural network 200 and the energy level in a vibration or sound signal is a continuous analog signal. However, as would be apparent to those skilled in the art, signals other than sound signals can be applied to the modified ARTMAP neural network 200. Furthermore, the present invention can also be used with an ART 1 neural network architecture if arbitrary sequences of binary input patterns are used as an input to the modified ARTMAP neural network 200.

Figure 4:
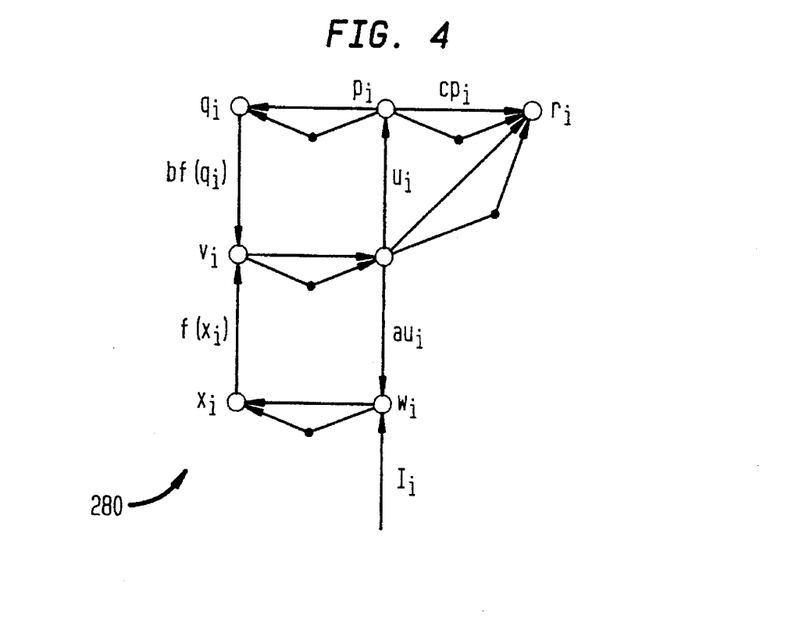
FIG. 4 is a more detailed illustration of the $F_1$ layer of the modified ARTMAP network.

In the modified ARTMAP network 200, the ART 2 network 225 has two layers: $F_1$ 280 and $F_2$ 290. Referring to FIG. 4, the $F_1$ layer 280 of the ART 2 network includes three processing levels and several gain control systems which enable the network to separate signal from noise and enhance the contrast of activation signals. Generally, each level performs two computations: integration of intrafield and interfield inputs to that level which produces an integrated activation signal and normalization of the integrated activation signal. The filled circles are the gain control systems which normalize the integrated activation signals.

Figure 7A:
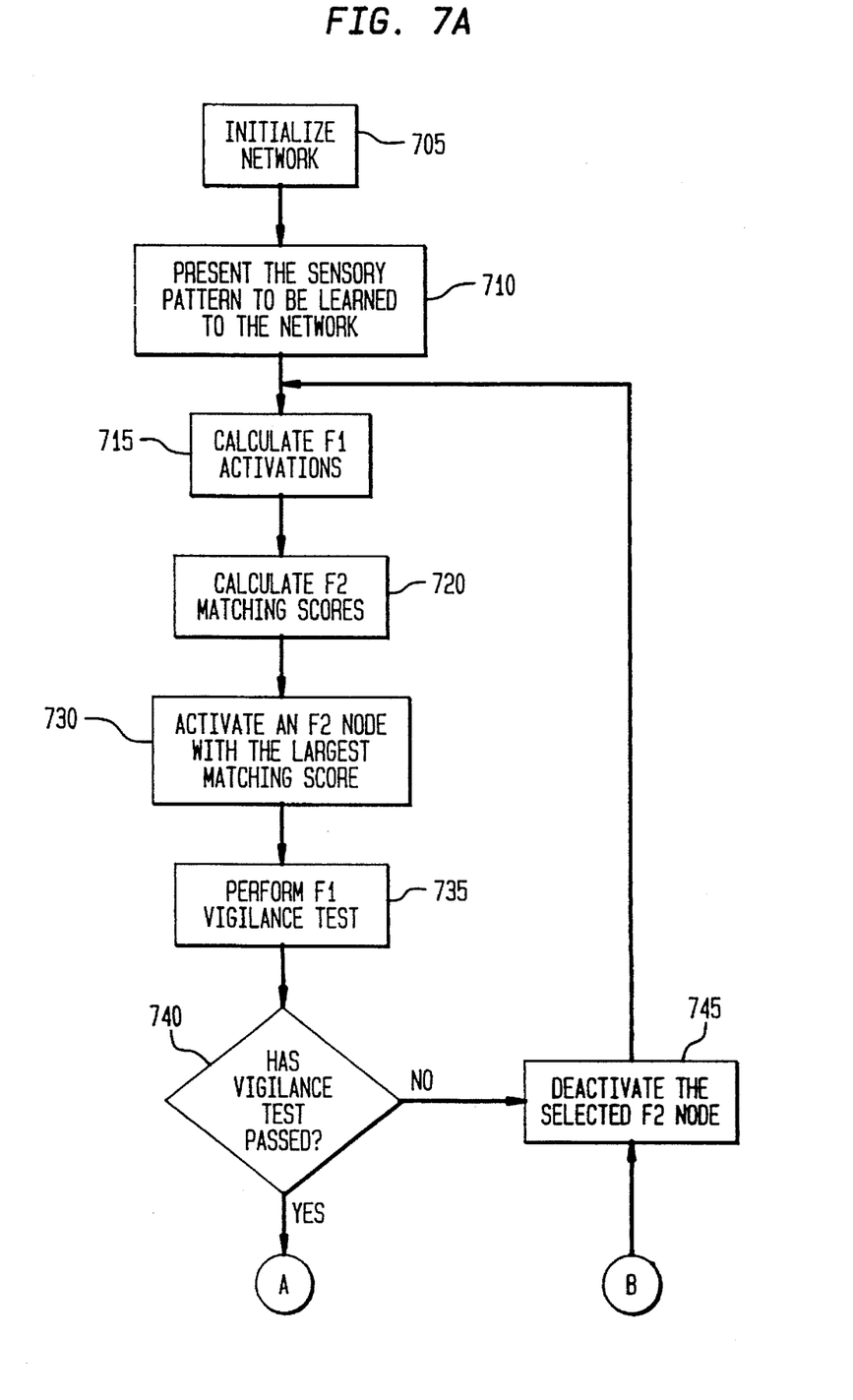
FIGS. 7a and 7b illustrates a flowchart of the training procedure used to train the modified ARTMAP network.
Figure 7B:
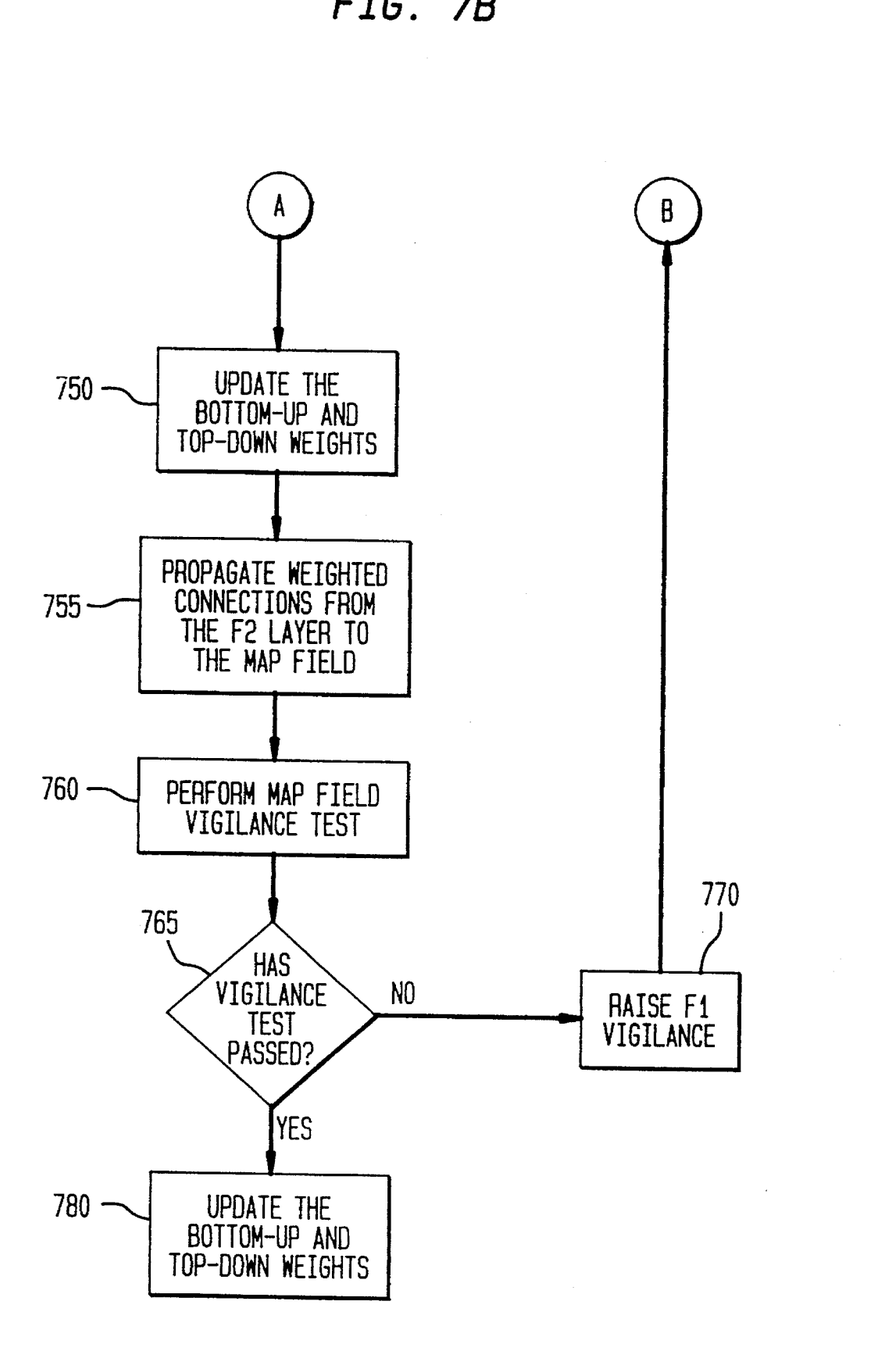

Training of the modified network is described below with reference to FIG. 4 and FIG. 7. FIG. 7 illustrates a flowchart of the procedure used to train the modified ARTMAP network 200.

As shown in block 705, before initiating training of the modified ARTMAP neural network 200, the following parameters are initialized:

$$T_{ji} = 0 \quad (4)$$

$$B_{ij} = \frac{1}{0.2 * \sqrt{N}} \quad (5)$$

$0 \leq i \leq N-1$, where N is the dimension of the input vector 210;

$0 \leq j \leq M-1$, where M is the number of $F_2$ nodes;

$w_i = x_i = v_i = u_i = q_i = p_i = 0$; and

Set a, b, c, d, e, θ, and σ.

As shown in block 710, an input pattern to be learned is presented to the modified ARTMAP network 200. Next, the activation signals between the different nodes of the F1 layer 280 are generated, as shown in block 715. At the lower level of the $F_1$ layer 280, vector $w_i$ is the integration of an intrafield input vector $I_i$ and the interfield feedback signal $au_i$, i.e., $$w_i = I_i + au_i \quad (6)$$

where i is the ith node at the $F_1$ layer 280 and a is a constant. Once the vector $w_1$ is obtained, then it can be normalized to yield $x_i$ by the following equation:

$$x_i = \frac{w_i}{e + \|w\|} \quad (7)$$

where e is a constant close to zero and $\|w\|$ denotes the $L_2$ norm of a vector w.

The rest of activities in the $F_1$ layer 280 can be calculated according to the following equations:

$$v_i = f(x_i) + bf(q_1) \quad (8)$$

$$u_i = \frac{v_i}{e + \|v\|} \quad (9)$$

$$q_i = \frac{p_i}{e + \|p\|} \quad (10)$$

$$p_i = u_i + \sum_j g(j) T_{ji} \quad (11)$$

where b is a constant, g(j) is the activation of the jth node in the $F_2$ layer 290, and $T_{ji}$ is the top-down weight between the jth node in the $F_2$ layer 290 and the ith node in the $F_1$ layer 280. The linear signal function f in Equation (8) is $$f(x) = \begin{cases} 0 & \text{if } 0 \leq x < \theta \\ x & \text{if } x \geq \theta \end{cases} \quad (12)$$

where θ is a threshold value.

As shown in block 720, once the nodes in the $F_2$ layer 290 receive an input signal from the $F_1$ layer 280 (via bottom-up weight $B_{ij}$), the matching score for the nodes in the $F_2$ layer 290 is then computed according to the following:

$$\mu_j = \sum_i p_i B_{ij} \quad (13)$$

where $B_{ij}$ are the bottom-up weights.

Then, as shown in block 730, the node in the $F_2$ layer 290 with the largest matching score is activated. The activation of the $F_2$ layer 290 is given below:

$$g(j) = \begin{cases} d & \text{if the } j\text{th } F_2 \text{ mode is active} \\ 0 & \text{otherwise} \end{cases} \quad (14)$$

where d is a constant between 0 and 1.

At this point, the $F_2$ layer 290 activation is propagated back to the $F_1$ layer 280. Next, as shown in block 735, the vigilance test 250 is carried out to determine whether the top-down signal matches the input pattern 210. The vigilance test 250 is given as follows:

$$r_i = \frac{u_i + cp_i}{e + \|u\| + \|cp\|} \quad (15)$$

$$\frac{p}{e + |r|} > 1? \quad (16)$$

where c is a constant and 0<p<1. If the match fails to pass the vigilance test 250, then a reset 260 is sent to $F_2$ 290 which forces $F_2$ 290 to deactivate the selected node in the $F_2$ layer and search for the next best match, as shown in block 745. Otherwise, the bottom-up ($B_{ij}$) and top-down weights ($T_{ji}$) are adapted from the following equations:

$$B_{ij*}(t+1) = d[p_i - B_{ij*}(t)] \quad (17)$$

$$T_{j*i}(t+1) = d[p_i - T_{j*i}(t)] \quad (18)$$

where j* is the selected node in the $F_2$ layer 290. The step of updating the bottom-up weights and the top-down weights if the vigilance test passes is shown in block 750.

Once the ART module 225 is presented with an input vector 210, it selects a node in the $F_2$ layer 290 which passes the vigilance test 250. Then, the $F_2$ layer 240 activations are propagated to the Map Field 230 through the weighted connections ($w_{jk}$) between the $F_2$ layer 240 and the Map Field 230, as shown in block 755. The signals received from the $F_2$ layer 290 are calculated by the following equation:

$$X = \omega_{j*} \quad (19)$$

At the map field 230, a second vigilance test 240 is performed to determine the level of match between the predicted output from the $F_2$ layer 290 (X) and the target output pattern 220 (Y), as shown in block 760. A mismatch between X and Y will trigger a map field reset 270 to the underlying ART module 225. This occurs whenever the following condition holds:

$$\frac{\|X\|}{\|Y\|} < p' \quad (20)$$

where p' denotes the associative memory vigilance parameter 240. If the map field reset 270 occurs, the vigilance 250 of the underlying ART module 225 is raised to prevent the system 200 from making repeated errors, as shown in block 770. At this point, a reset 260 is sent to the $F_2$ layer 290 and forces the $F_2$ layer 290 to find the next best match, as shown in block 745. This process will continue until the second vigilance test 240 succeeds. Once the second vigilance test 240 is passed, the top-down weights ($T_{ji}$) and bottom-up weights ($B_{ij}$) between the $F_1$ layer 280 and the $F_2$ layer 290 are adapted according to Equations (17) and (18), and the weights between the $F_2$ layer 290 and the Map Field 230 are updated by the following equation:

$$\omega_{j*k} = Y_k \quad (21)$$

The step of updating the top-down weights ($T_{ji}$) and the bottom-up weights ($B_{ij}$) is shown in block 780.

For the bottom-up and top-down weights, the weight adaption process is done iteratively for each training pattern. This is because the normalized input vector 210, represented by p, is also updated after each update iteration is made. Then, the new vector p in the $F_1$ layer 280 is used for the next weight update iteration (see Equations (17) and (18)).

During the training phase, both input vector 210 (i.e., AR parameters) and target output vector 220 (i.e., fault class) are presented to the network. Then the network starts to learn the association between the input vector 210 and the target output vector 220 according to the procedure described above. During the diagnosis phase, only an input vector 210 is provided to the network. The node in the $F_2$ layer 290 which passes the $F_1$ vigilance test 250 represents the network's output (i.e., predicted fault class).

Another unique function of the modified ARTMAP network 200 is its "unlearn" capability. In contrast to the network learning capability, the "unlearn" procedure removes "undesired" knowledge that has previously been learned by the network. This is very useful when a previously learned pattern is found to be a wrong pattern. In such a situation, one way to correct this mistake is to retrain all the patterns except the undesired one, which is not very feasible. A more efficient way to unlearn a pattern is to reset the network weights disregarding the incorrect pattern.

Figure 8:
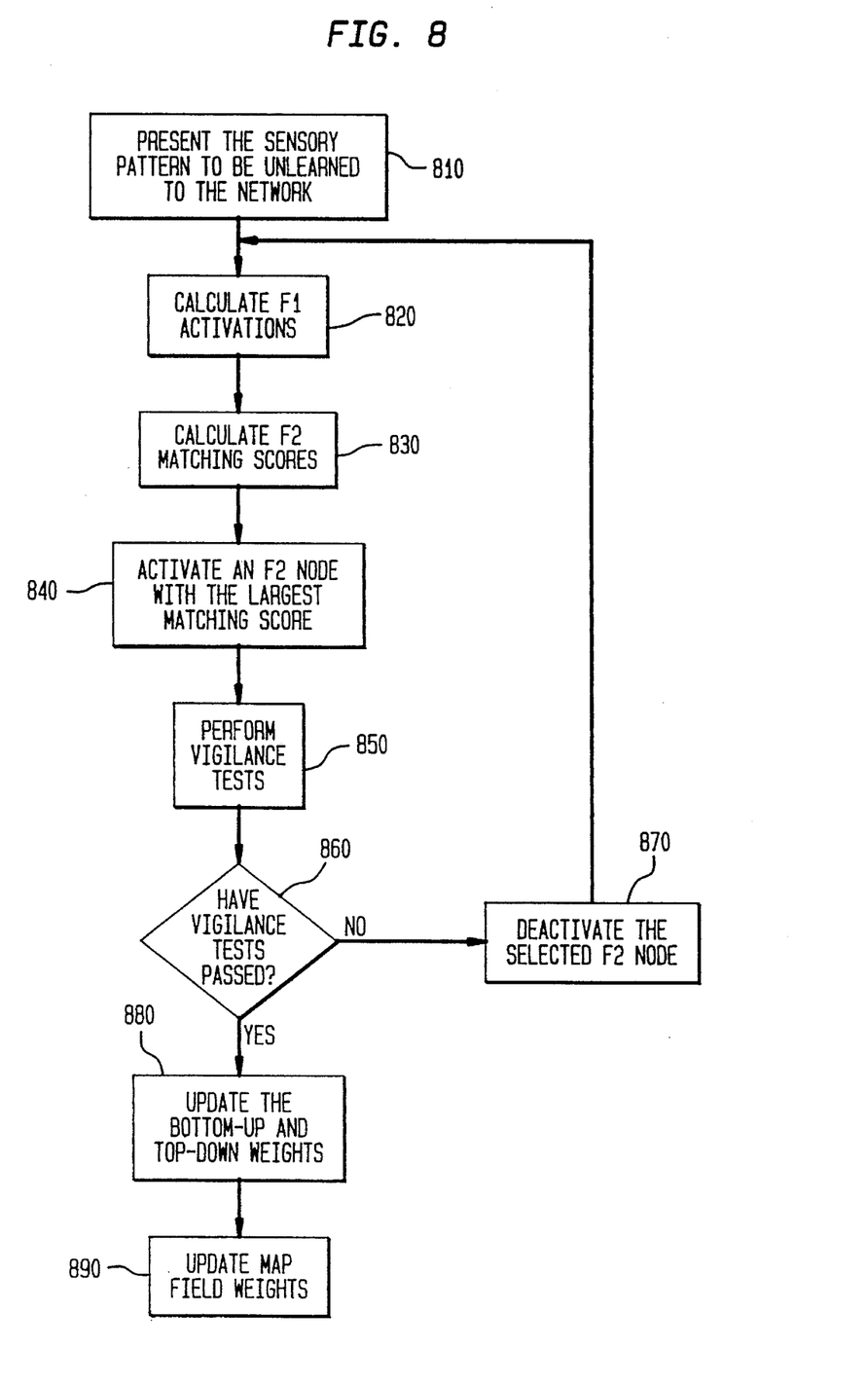
FIG. 8 illustrates a flowchart of an unlearn procedure to be used in training the modified ARTMAP network.

Generally, the "unlearn" procedure is the same as the training procedure describe above. The unlearn procedure is illustrated in FIG. 8. Once an $F_2$ node passes both vigilance tests 250 and 240 the network weights are adapted according to the following equations:

$$B_{ij*} = \frac{1}{(1-d)\sqrt{N}} \quad (22)$$

$$T_{j*k} = 0 \quad (23)$$

where N is the number of nodes in the $F_1$ layer 280 and d is a constant between 0 and 1.

The map field 280 weights are updated from the following equation:

$$w_{j*k} = 0 \quad (24)$$

D. Network Diagnosis

Figure 6:
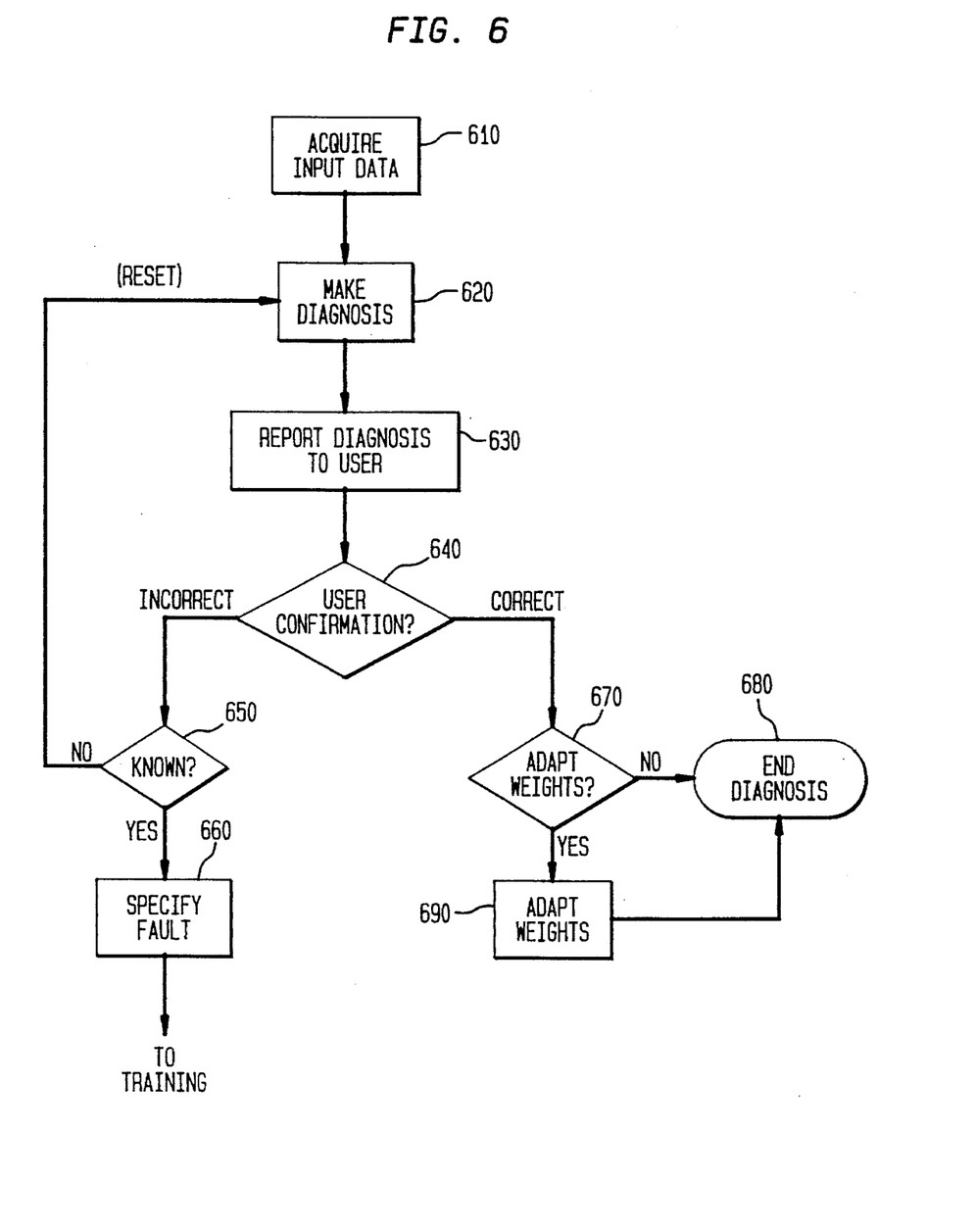
FIG. 6 illustrates a network diagnosis procedure.

The network diagnosis procedure is illustrated in FIG. 6. Diagnosis takes place after the modified ARTMAP network 200 has been trained using the procedure described above. As shown in block 610, the modified ARTMAP network 200 initially acquires input data from a user or directly from a physical machine or process. After receiving an input, the ART 2 network 225 hypothesizes a diagnosis, as shown in block 620. If the hypothetical diagnosis passes the first vigilance test 250, the diagnosis result is reported to the user, as shown in block 630. In block 640, the user is asked to confirm the network diagnosis. If the diagnosis is correct, the user can either select to train the network with the present input pattern, i.e., ask the network to adapt its weights, or quit the diagnosis process, as shown in blocks 690 and 680 respectively. If the diagnosis is found incorrect, two options are available. The user may specify, as shown in block 660, the correct fault classification and train the network if he/she knows the correct fault classification, or the user may request the network to make another diagnosis (i.e., return to block 620).

In order to test the system, a total of 48 data sets and three different machine conditions (i.e., normal, bearing failure, and misalignment) were used and divided into two parts: 15 data sets for training and the rest of the data sets for testing. The effects of the vigilance value and the training set size were also investigated. The performance of the network remained the same when the vigilance was set to 0.3, 0.5, 0.7, 0.8, or 0.9. However, when the training set size was set to 3 (one for each category), the network achieved about 97% accuracy. Once the training set size was increased to 6 (two for each category), the network was able to correctly identify all the test data.

E. Performance Analysis of Modified ARTMAP Network

The performance of the modified ARTMAP network 200 described above was validated by employing three different kinds of sensory data: theoretical bearing signatures, lab bearing signatures, and real production machine signatures. In a preferred embodiment, the modified ARTMAP network 200 is designed to provide two suggested fault classifications to the user in every diagnostic session, with the first one being the most likely cause.

The theoretical vibration signatures used to test the FDN are generated from bearing physical models. A total of six different bearing faults (inner race, outer race, roller spin, cage defect, misalignment, and imbalance) were used. For each bearing fault, five data sets were generated to train and test the network. Different amplitudes and noise levels were used to simulate real life data. The theoretical equations for calculating these bearing defect vibration frequencies are listed in Appendix A. The first data set of each defect was used to train the network while the rest were used to test the network performance.

Figure 9:
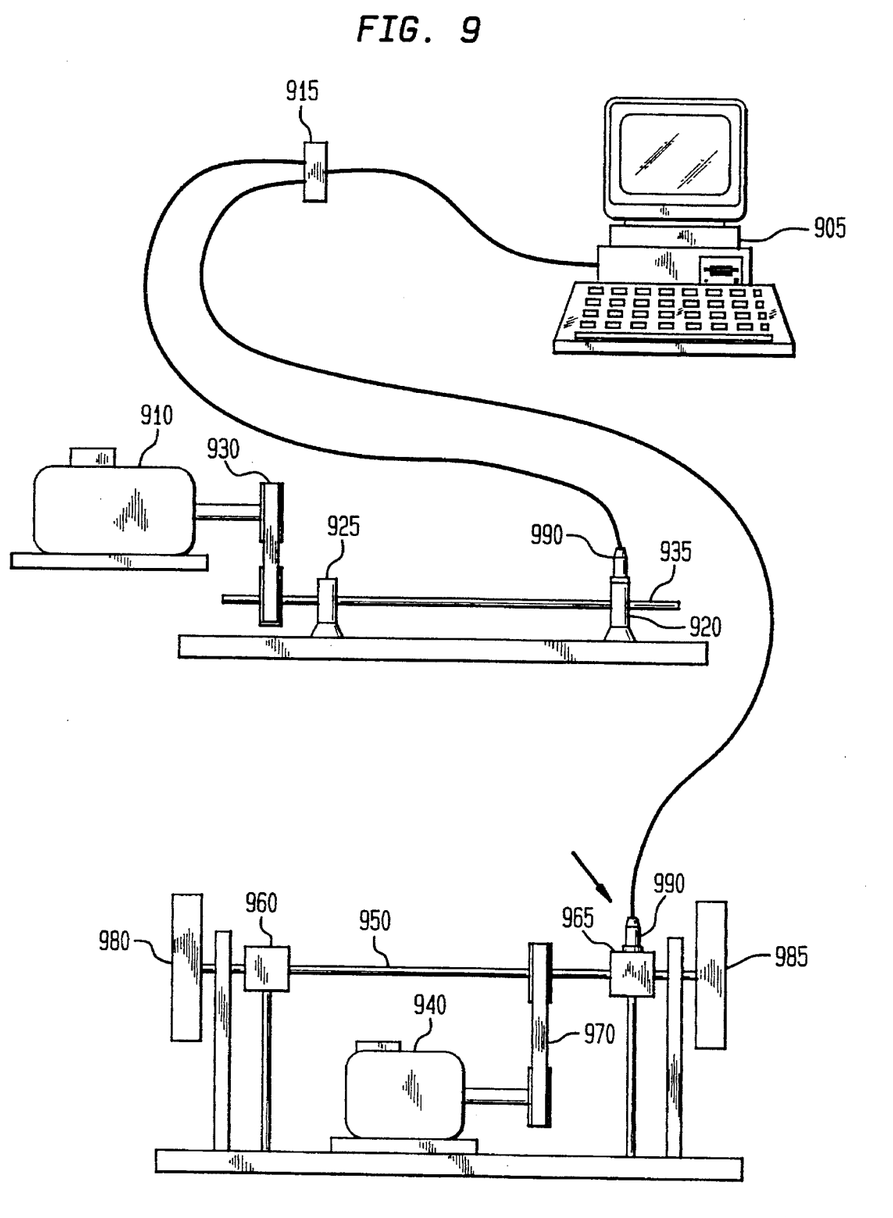
FIG. 9 illustrates a pair of lab experiment settings for testing the modified ARTMAP network.

Referring to FIG. 9, the FDN was also validated using two lab experiment settings. The first setting consisted of a motor 910, two bearings (not shown), two pillow blocks 920, 925, a drive belt 930, and a shaft 935. The second setting consisted of a motor 940, a shaft 950, two sleeve bearings 960, 965, a belt 970, and two hubs 980, 985. An accelerometer 990 is mounted on the bearing supporting block of each setting. Vibration signals were collected via the accelerometers 990 and the signals were magnified by a power supply unit 915, as required by a data acquisition board installed in a 486 personal computer 905.

Four bearing conditions were created with the first experiment setting: normal, misaligned, looseness, and contaminated. Eight sets of vibration signals were collected under each condition. Thus, there were a total of 32 data sets. The modified ARTMAP network 200 was trained with the first eight data sets for each condition and tested with the other seven data sets.

The primary objective of using the second experimental setting was to create different imbalance conditions. It is well known that imbalance is the most common machine fault. Five different levels of an imbalanced-hub condition were created by attaching a screw, a piece of clay, or both to the hub 980, 985. Under each condition, 10 signals were collected. The first data set of each condition was used to train the modified ARTMAP network 200 to learn the condition. The other nine data sets were then used as test patterns.

Vibration data was collected off a K&T 7-axis machining center and was used to train/test the modified ARTMAP network 200. There were three conditions: normal, imbalance, and electric motor stator defect. Two vibration signals were collected under each condition. The modified ARTMAP network 200 was trained for all three conditions using one vibration signal from each condition. The other signals were used for diagnosis. The result indicates that the FDN was able to correctly identify all conditions.

As described above, the present invention also implements an unlearn procedure that removes "undesired" knowledge from the FDN. This procedure is very useful when a previously learned pattern is found to be a wrong pattern because the FDN does not have to relearn all the correct patterns. In order to gain insights into how the unlearn procedure works, a sample session of this procedure was performed. In the session, three simple data sets were used to train the network. Each data set consisted of a vector of three data elements as listed below:

| a1: | 1 0 0 |
| a2: | 0 1 0 |
| a3: | 0 0 1 |

The category of a1, a2, and a3 was defined as cat1, cat2, and cat3, respectively.

FIG. 10 shows the network file of a 3-5-5 network before and after unlearning pattern a2. The first row in the network file contains network information, such as number of input nodes (3), number of F2 nodes (5), number of Map Field nodes (5), vigilance value (0.9), number of assigned categories (3), and index of the last assigned node (2). Rows 2 to 6 store the category of patterns trained. The remaining portion of the file stores the table of network weights. After pattern a2 was unlearned, the number of assigned categories and index of the last assigned node were changed from 3 to 2, and from 2 to 1, respectively. In addition, category "cat2" was removed from the network file and the weight table was updated.

It is well known that utilization of multiple sensors can improve diagnostic reliability. Therefore, the capability of the modified ARTMAP network 200 was further tested with multiple sensory input. Two sensory signals, vibration and sound, were collected from the first experimental setting (shown in FIG. 9). In addition to an accelerometer 990, an acoustic emission transducer (not shown) was mounted on the bearing housing to collect sound signals.

During the training and testing process, both vibration and sound signals were presented to the modified ARTMAP network. In this study, both sensory inputs were treated as equally important, i.e., they were designated as having the same network weights. If the importance between these two sensors is unequal, then this difference can be represented by adjusting their initial bottom-up weight settings. The initial bottom-up weight settings for two different sensory inputs is given in the following equation:

$$B_{ij} = \frac{(1 + m_1)}{(1 - d)\sqrt{N_1 + N_2}} \quad \text{if } i < N_1 \tag{25}$$

$$\frac{(1 + m_2)}{(1 - d)\sqrt{N_1 + N_2}} \quad \text{if } N_1 \leq i < N_2$$

$$0 \leq i < N_1 + N_2$$

where $N_1$ is the dimension of vibration input vector;

$N_2$ is the dimension of sound input vector;

$m_1$ is the weighting factor of sound signal;

$M_2$ is the weighting factor of vibration signal;

For example, if 70% emphasis is placed on the vibration signal and 30% on the sound signal, then the value of $m_1$ and $m_2$ is equal to 0.7 and 0.3, respectively.

While the invention has been particularly shown and described with reference to preferred embodiments thereof, it will be understood by those skilled in the art that various changes in form and details may be made therein without departing from the spirit and scope of the invention.

What is claimed is:

1. A computer-implemented method of training and testing a modified ARTMAP neural network, wherein the modified ARTMAP neural network has an ART module that accepts an input pattern, and a Map field, connected to said ART module, that accepts a target output pattern, the computer-implemented method comprising:

(1) providing both the input pattern and the target output pattern to the modified ARTMAP neural network;

(2) updating a set of top-down weights and bottom-up weights based on a first vigilance test;

(3) propagating a predicted output from the ART module to the Map field;

(4) updating said set of top-down weights and said bottom-up weights based on a second vigilance test, wherein said second vigilance test is based on a comparison between the target output pattern and said predicted output; and (5) removing undesired knowledge from the modified ARTMAP neural network, wherein said step of removing further comprises the steps of:
 (a) presenting a sensory pattern to be unlearned to the modified ARTMAP neural network;
 (b) updating bottom-up and top-down weights and Map field weights based on said first vigilance test and said second vigilance test.

2. A computer-implemented method of training and testing a modified ARTMAP neural network, wherein the modified ARTMAP neural network has an ART module that accepts an input pattern and has a first layer and a second layer, and a Map field, connected to said ART module, that accepts a target output pattern, the computer-implemented method comprising:

(1) presenting an input pattern to be learned to the modified ARTMAP neural network;

(2) determining a set of activations for the first layer;

(3) determining a set of matching scores for the second layer;

(4) activating a node with a largest matching score from the second layer, wherein said activated node is a predicted output;

(5) performing a first vigilance test based on said activation of said node, and if said first vigilance test fails then deactivating said activated node and repeat steps (2) through (5), otherwise update bottom-up and top-down weights between the first layer and the second layer, and update weights between the second layer and the Map field;

(6) propagating said matching scores from said second layer to the Map field;

(7) performing a second vigilance test to determine a level of match between said predicted output from said second layer and the target output pattern, if said second vigilance test is passed, updating said bottom-up weights, said top-down weights, and said weights between the second layer and the Map field; and (8) removing undesired knowledge from the modified ARTMAP neural network, wherein said step of removing further comprises the steps of:
 (a) presenting a sensory pattern to be unlearned to the modified ARTMAP neural network;
 (b) determining a set of activations for the first layer;
 (c) determining a set of matching scores for the second layer based on said set of activations;
 (d) activating a node from the second layer with the largest matching score; and
 (e) performing at least one vigilance test, and if said at least one vigilance test fails then deactivate said activated node and repeat steps (2) through (5), otherwise update bottom-up and top-down weights between the first layer and the second layer, and Map field weights between the second layer and the Map field.

3. The method of claim 2, wherein said input pattern is normalized before being presented to said modified ARTMAP neural network.

4. The method of claim 2, wherein step (7) further comprises the steps of sending a reset signal to the ART module if said second vigilance test fails, raising said first vigilance test to prevent further errors from occurring, and activating another node from the second layer.

5. The method of claim 4, further comprising the steps of repeating steps (5) through (7) for said activated another node.

6. The method of claim 5, further comprising the steps of iteratively repeating steps (1) through (7) for each input pattern.

7. The method of claim 6, further comprising the step of saving said bottom-up weights and said top-down weights for use during a diagnosis stage.

8. The method of claim 7, wherein said diagnosis stage includes the steps of:

(i) acquiring input data from a user;

(ii) hypothesizing a diagnosis based on said acquired input data; and (iii) checking to determine whether said diagnosis passes the first vigilance test, if said diagnosis passes said first vigilance test than reporting the results of said diagnosis to said user, wherein said user can train said neural network with the present input pattern, if said diagnosis fails said first vigilance test then said user can either train the modified ARTMAP neural network with a known correct fault classification, or request another diagnosis.

9. The method of claim 2, further comprising the step of normalizing said input pattern before presenting said input pattern to the modified ARTMAP neural network.

10. The method of claim 2, further comprising the step of initializing said bottom-up weights and said top-down weights before initiating the training of the modified ARTMAP neural network.

11. A computer-implemented method of removing undesired knowledge from a modified ARTMAP neural network, wherein said modified ARTMAP neural network has an ART module and a Map field connected to the ART module, wherein the ART module comprises a first and a second layer, the first layer accepting an input pattern, and the Map field accepting a target output pattern, the computer-implemented method comprising:

(1) presenting a sensory pattern to be unlearned to the modified ARTMAP neural network;

(2) determining a set of activations for the first layer;

(3) determining a set of matching scores for the second layer based on said set of activations;

(4) activating a node from the second layer with a largest matching score; and (5) performing at least one vigilance test, and if said at least one vigilance test fails then deactivate said activated node and repeat steps (2) through (5), otherwise update bottom-up and top-down weights between the first layer and the second layer, and update Map field weights between the second layer and the Map field.

12. The method of claim 11, wherein said step (5) further comprises the step of updating said bottom-up and top-down weights and said Map field weights according to the following equations:

$$B_{ij^*} = \frac{1}{(1-d)\sqrt{N}}$$

$$T_{j^* k} = 0; \text{ and } w_{j^* k} = 0,$$

wherein d is a constant between 0 and 1 and N is the dimension of the input pattern.

13. A system for removing undesired knowledge from a modified ARTMAP neural network, wherein the modified ARTMAP neural network has an ART module and a Map field connected to said ART module, wherein the ART module comprises a first and a second layer, the first layer accepting an input pattern, and the Map field accepting a target output pattern, comprising:

(1) means for presenting a sensory pattern to be unlearned to the modified ARTMAP neural network;

(2) means for determining a set of activations for the first layer;

(3) means for determining a set of matching scores for the second layer based on said set of activations;

(4) means for activating a node from the second layer with a largest matching score; and (5) means for performing at least one vigilance test, and if said at least one vigilance test fails then deactivate said activated node and repeat steps (2) through (5), otherwise update bottom-up and top-down weights between the first layer and the second layer, and update Map field weights between the second layer and the Map field.

14. The system of claim 13, wherein said bottom-up and top-down weights and said Map field weights are updated according to the following equations:

$$B_{ij^*} = \frac{1}{(1-d)\sqrt{N}}$$

$$T_{j^* k} = 0; \text{ and } w_{j^* k} = 0,$$

wherein d is a constant between 0 and 1 and N is the dimension of the input pattern.

* * * * *